United States Patent [19]

Huang et al.

[11] 4,157,962
[45] Jun. 12, 1979

[54] FILTRATION METHOD AND APPARATUS

[76] Inventors: Jerry Y. C. Huang, N 81 W5227 Bywater La., Cedarburg, Wis. 53012; George E. Wilson, 4212 N. River Way, Sacramento, Calif. 95825; Phillip C. Fischbach, 2249 Rogue River Dr., Sacramento, Calif. 95826

[21] Appl. No.: 852,626

[22] Filed: Nov. 18, 1977

[51] Int. Cl.² .................................................. B01D 23/24
[52] U.S. Cl. ...................................... 210/42 R; 210/70; 210/80; 210/82; 210/265; 210/275
[58] Field of Search ................... 210/42 R, 49, 51, 54, 210/70, 80, 82, 73 R, 73 OW, 73 SG, 265, 279, 280, 333 R, 333 A, 270, 273, 275

[56] References Cited
U.S. PATENT DOCUMENTS

| Re. 18,301 | 12/1931 | Peebles | 210/270 |
|---|---|---|---|
| 2,195,415 | 4/1940 | Lose | 210/270 |
| 3,039,612 | 6/1962 | Palmer | 210/273 |
| 3,719,592 | 3/1973 | Hayashi | 210/80 |
| 3,792,773 | 2/1974 | Ross | 210/82 |
| 3,846,304 | 11/1974 | Garbo | 210/80 |
| 3,977,970 | 8/1976 | Willis | 210/82 |

Primary Examiner—Charles N. Hart
Assistant Examiner—Ernest G. Therkorn

Attorney, Agent, or Firm—Lothrop & West

[57] ABSTRACT

In the filtration cycle, a fluid such as water containing suspended solid waste matter is treated with a coagulating agent and gravity-fed through a plurality of individual filter cells, or modules, containing a particulate, coarse, granular filter media. Backwashing is effected by injecting water into the filter media at the bottom center of the cell, causing the filter media to well upwardly and to form on the surface a series of polarly oriented ridges and troughs, the troughs serving to guide "mudballs" and coagulant particles on the media into an inlet port connected to the injector pipe where the high pressure water breaks up the mudballs into manageable particle sizes and scours the media. Solid particles suspended in the water overlying the media are drawn off through a backwash overflow and are fed into a clarifier where separation is effected and clarified water is provided for re-injection into the media.

The backwash cycle is thereby performed through the closed-circuit use of clarified water that scours and cleans the filter media, breaks up "mudballs" and then is itself purified and readied for another cleansing cycle. The amount of clear water required in a final "polishing" backwash step to remove residual flocculated solid matter is thus minimal.

9 Claims, 5 Drawing Figures

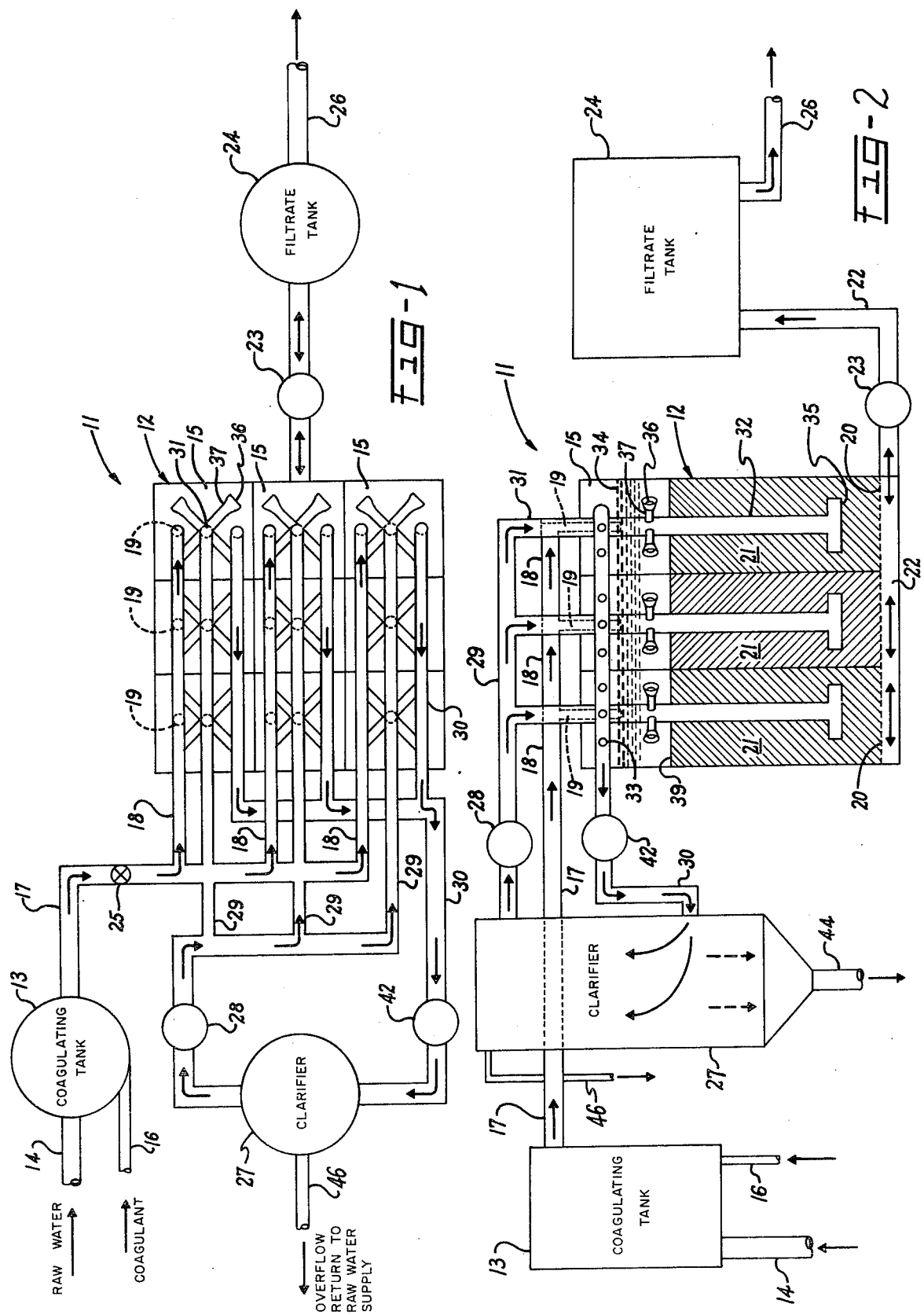

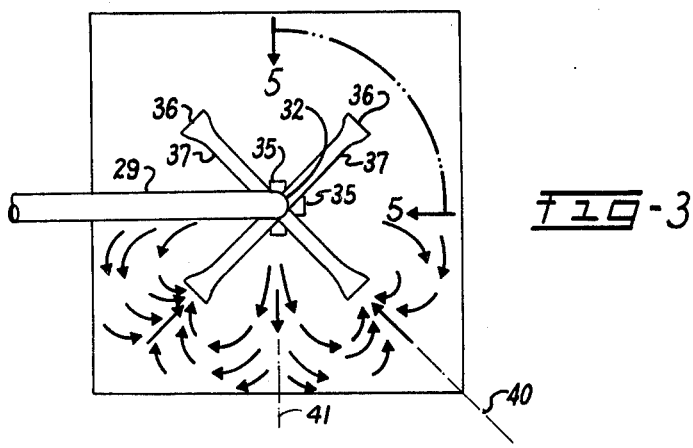
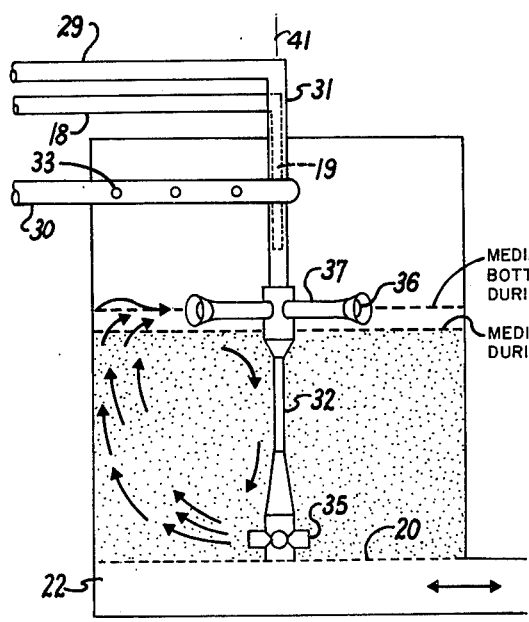
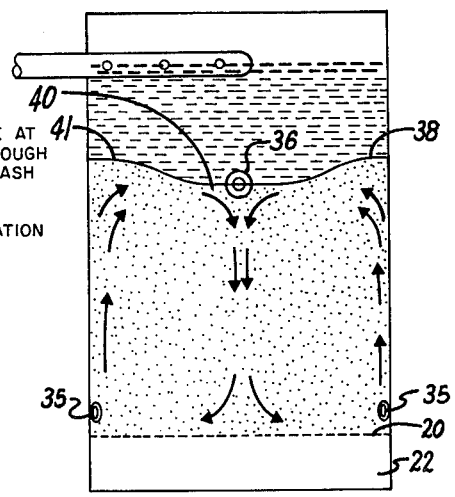

FILTRATION METHOD AND APPARATUS

BACKGROUND OF THE INVENTION

Granular media filtration is a process employed to remove material suspended in water or other fluid. Such suspended material is not readily separable from the fluid by gravity forces owing to insignificant density differences between the suspending fluid and the suspended solids. The problem is overcome by forming the suspended solid particles into clusters or aggregates. Flocculation is the process most often utilized to form aggregates of solid particles suspended in a fluid. These aggregates are formed as a consequence of velocity gradients which bring the particles in contact with one another.

In state of the art filtration, flocculation is normally an operation which occurs immediately ahead of filtration, although often with a gravity sedimentation step therebetween. In other words, suspended particles in a liquid are first aggregated to form settleable masses, most of which are separated in the gravity sedimentation step. The residual suspended particles, which have density differences relative to the suspending liquid insufficient to effect gravity separation in a reasonable period of time, remain in the suspending liquid and are separated by the subsequent filtration step.

Flocculation and gravity sedimentation, then, remove the bulk of the suspended solids, while subsequent filtration removes the residual suspended particles.

Granular media filtration is a complex process in which the removal of the suspended material can be attributed to a number of different forces: sedimentation; impact; physical Van der Waal forces; chemical bonding; absorption; and screening. The effective size of the granular media is selected to be as small as possible without resulting in rapid plugging of the filtration media. Two stage granular media filters are commonly used in the filtration process: the first stage consists of a relatively coarse coal material having an average particle size in the vicinity of one millimeter, while the second stage is composed of a granular sand material having an average particle size of approximately 0.1 millimeter. Such two stage filters generally exhibit longer filtration runs between backwashes in that large suspended particles which would rapidly plug the fine sand media are removed by the coarse media in the first stage, while the finer material is removed in the fine sand stage.

Filtration is a periodic process which of necessity must be coupled with a backwash cycle that effects removal of materials entrapped in the media during filtration. The most common method of backwashing the media requires an upflow of fluid which expands the filter media bed and induces hydrodynamic forces around each media element to effect both cleaning of the media and transport of the removed suspended material from the filter. Simple upflow and expansion of the bed is generally insufficient to effectively clean the filter media. Therefore, additional steps are taken to clean the media, such as mechanically raking the surface of the expanded filter bed, bubbling air through the filter bed and spraying the surface of the filter bed with high-velocity wash water.

The backwashing cycle imposes limitations upon the practical design of the filter bed. It is generally recognized that a coarse filtration media results in a longer filter run due to much better distribution of filtered solids throughout the filter bed before backwash is required. However, the use of such coarse media has not been practiced as the backwash water requirements are excessive.

Such a system requires a backwash water volume approaching the filtered water volume, rendering the system impractical. As a consequence, the above mentioned characteristic two-stage media sizes have been employed in commercial filters to ensure that the backwash volume required is limited to less than 5% of the filtered water volume.

The limitations imposed on the effective filter media size also delimit the concentrations of suspended solids that the filter can absorb from the waste-water, due to the rapid plugging of such beds. Thus granular media filtration has been practically limited to flows having less than 100 milligrams of suspended solids per liter of wastewater. It has been demonstrated that at suspended solid concentrations above such a value, the backwash water volume again approaches the filtered water volume.

In contrast to state of the art filtration systems, the present invention combines the distinct advantages of a coarse filter media with an efficient backwash system. To achieve the maximum benefits of the invention, it is desirable that the fluid to be treated is coagulated but not flocculated prior to application to the filter medium. The coagulated fluid is impacted upon the coarse filter medium where flocculation occurs. When an individual media particle is no longer able to absorb flocculated suspended solids, subsequent flocculated suspended solids in the fluid effectively bypass this media particle and are forced through the media to subsequent elements. Through such a scouring process, plugging of the filter media will not occur and the entire filter bed can be used for storage of the suspended solids. When the filter bed becomes completely saturated with solids, the solids will "breakthrough" the filter bed and the filter bed with require backwashing.

To achieve the above objective during the filtration cycle, it is necessary to use a coarse granular media, such as sand having a size in excess of 1 millimeter and preferably larger than 3 millimeters. Such media requires a very high upflow velocity of clean fluid to achieve the filter bed expansion necessary in the backwashing step. Unfortunately this makes the coarse filter media impractical as almost the same volume of cleansing water is required to clean the filter as was filtered beforehand. The backwash cycle as practiced in accordance with this invention circumvents this problem by utilizing recycled backwash water to satisfy upflow requirements to expand the coarse media filter bed and separate the accumulated solid material from the filter media.

This initial high upflow rate is used in conjunction with a filter media cleaning step in which an ejector system draws large solids and media particles into a high velocity stream of cleansing water. This special cleansing cycle scours media particles and breaks up "mudballs" of solid materials. The ejector system is an integral part of the primary upflow cleansing system, which uses clarified water as a cleansing water. Water and suspended solids are drawn off above the upper level of the filter media during the backwash, and fed into a clarifier. The clarifier effectively separates suspended solids from the water, and recycles clarified water back into the upflow cleansing system. Thus, the present invention uses a two stage cleansing process which effectively cleans the coarse filter media while recycling the cleansing water to make the entire backwash cycle practical in terms of water use. As a final polishing step, filtered water from a clear water tank is injected into the bottom of the filter media to remove any residual materials from the bed. In such a manner, the net backwash water volume is held to less than 2% of the filtered water volume.

The flocculation/filtration system as described above must be considered integrally with the backwash cycle in that any granular media filtration system involves a filter media cleaning step in conjunction with a filtration step. The significant improvements of the present invention compared to state of the art filtration systems are primarily attributable to these two integral cycles: the use of a uniform coarse filter media allowing practical intramedia flocculation and solid storage heretofore not attainable in state of art filters, and a method of filter backwash cleaning which is especially applicable to the use of such a coarse media. The cleaning cycle disclosed accomplishes effective cleaning of coarse filter media while using no more and in many cases less backwash water than that required by conventional state of the art filters.

SUMMARY OF THE INVENTION

The present invention relates to a method and apparatus for flocculation/filtration which can be used either in new construction or adapted to an existing fluid treatment installation with advantageous results.

It is an object of the invention to provide a filter in which the intramedia solid storage capacity is significantly greater than that possible in filter installations heretofore known.

It is another object of the invention to provide a filter which can accept significantly higher suspended solid concentrations in the fluid loaded on the filter with filter runs commensurate with or greater than state of the art filters.

It is still another object of the invention to provide a filter which, when loaded with liquids having suspended solid concentrations similar to those commonly applied to state of the art filters, will exhibit filtration run lengths significantly greater than heretofore known.

It is yet another object of the invention to exhibit significantly greater intramedia suspended solid storage capacities, suspended solid loading rates, and effective filtration periods all with net pressure head losses through the filter media which are less than or equal to pressure head losses heretofore known in the filtration art.

It is a further object of the invention to provide an efficient intramedia flocculation system which optimally flocculates suspended solids and entraps the suspended solids within the filter media.

It is still another object of the invention to provide an intramedia flocculation system which greatly reduces the required flocculation period for production of flocculated particle sizes which can be effectively removed by a granular filter media system.

It is yet another object of the invention to achieve the above improvements in filtration performance while limiting the backwash volume to less than 2% of the filtered water volume.

It is an additional object of the invention to provide a backwash apparatus which effectively cleans the granular filter media and eliminates the "mudballs" commonly occuring in wastewater filtration installations.

It is still another object of the invention to provide a generally improved filtration method and apparatus.

Other objects, together with the foregoing, are attained in the embodiment described in the following description and are illustrated in the accompanying drawing.

BRIEF DESCRIPTION OF THE DRAWING

FIG. 1 is a top plan view of an apparatus for performing the filtration method of the present method;

FIG. 2 is a schematic side elevational view of the apparatus but with the position of some of the elements rearranged;

FIG. 3 is a schematic top plan view to an enlarged scale, of a single filtration cell, or module, showing details of the injector system and fluid flow patterns during the backwash cycle;

FIG. 4 is a schematic side elevational view of FIG. 3; and,

FIG. 5 is a sectional view, taken on the arc 5—5 in FIG. 3.

DESCRIPTION OF THE PREFERRED EMBODIMENT

While the filtration method and apparatus of the invention is susceptible of numerous physical embodiments, depending on the environment and requirements of use, the herein shown and described embodiment has been made, tested and used, and has performed in an eminently satisfactory manner.

A filtration apparatus for performing a filtration method in accordance with the present invention is generally designated in FIGS. 1 and 2 by the numeral 11 and comprises a filter bed 12. The filter bed 12 is partitioned into nine individual filtration cells 15, or modules, square in plan in the present embodiment.

A fluid, such as water, containing suspended solid matter is introduced into a coagulating tank 13 through a fluid inlet pipe 14. A chemical coagulant, such as alum or a polyelectrolyte, is introduced into the tank 13 through a coagulant inlet pipe 16 and mixed with the fluid therein, causing the suspended solid matter to coagulate.

The fluid with the suspended coagulant solid matter is fed through a pipe 17 and header pipes 18 located above the individual cells 15 of the filter bed 12. Feed pipes 19 lead vertically downwardly from the headers 18 into the respective cells 15 of the filter bed 12. The pipes 19, as shown most clearly in FIG. 2, extend only part way into the upper portion of the respective modules 15.

As also appears most clearly in FIG. 2, a particulate filter media 21, such as coarse sand, is provided in the lower portion of each of the modules 15, or cells, forming the filter bed 12, the filter media 21 being indicated by cross hatching in FIG. 2 and by dots in other figures. The media particle size is selected so that the coagulated solid matter, suspended in fluid and introduced into the cells through the feed pipes 19, is caused to flocculate and become entrapped in the filter media 21. The filtered fluid passes through openings 20 in an underdrain 22 of the filter bed 12 and is pumped by means of a reversible pump 23 into a clear fluid tank 24. During the filtration portion of the process the clear filtered fluid or filtrate, can be continuously removed for use from the tank 24 through an outlet pipe 26.

During the filtration cycle, the level of the fluid is approximately that indicated by the numeral 34 in FIG.

2 and the surface of the filter media 21 is at the location indicated by the reference numeral 39 on top of the crosshatching in FIG. 2.

After a certain amount of fluid has been filtered, the filter media 21 becomes saturated with entrapped flocculated solid waste matter which must be removed before further filtering can continue. This is accomplished by a novel backwash method in further accordance with the present invention.

After shutting valve 25 in line 17 to stop the flow of the raw water plus coagulant from the coagulating tank 13, the pump 23 is reversed, thereby causing some filtrate from the filtrate tank to flow back into the underdrain 22 and upwardly through the openings 20 in the bottom of the filter bed cells 15. The effect of this upflow is to expand, partially, the filter media 21.

At this juncture, the filtrate pump 23 can be shut down, if desired. Simultaneously, clarified water from a clarifier 27 is injected into the respective cells 15 of the filter bed 12 through a pump 28, header pipes 29, feed pipes 31, injectors 32 (as the feed pipes 31 are called after descending into the filter media 21), and lateral injector discharge pipes 35, or ejectors, as they are sometimes termed herein.

As the clarified water is urged upwardly through the previously partially expanded media 21, the expanded filter media wells up to form a boil on the surface of the media 21, contiguous the walls of the individual filter cells 15. Simultaneously, a series of radially oriented troughs 40 and interspersed ridges 41 forms on the surface of the media 21. Each of the troughs 40 is aligned with a respective one of a plurality of injector inlet ports 36 on the outer ends of radial inlet port pipes 37 connected to the upper portion of the injector pipes 32. The inlet ports 36 are so situated that the troughs 40 approximately intersect the lower half of the respective port 36 when viewed in side elevation as appears in FIG. 5. The series of undulating polarly oriented hills and valleys formed on the media surface assumes a pattern in which the axes of the ridges 41 are located angularly half way between the axes of the troughs 40.

The flow of water through the injectors 32 causes a vacuum such that water and particles from the top of the media surface flow into the troughs 40 and are guided radially inwardly and downwardly in the troughs to the inlet ports 36. The material conducted radially inwardly by the troughs 40 is drawn in through the inlet ports 36 and the inlet port pipes 37 connected to the injector pipe 32, thereby providing advantageous results, as will now be described.

The normal operation of the filter causes "mudballs" (relatively dense coagulant particles of solid matter which impede effective backwash operation) to form within the filter media 21. The density of the mudballs relative to the filter media 21, as well as the turbulent state of the filter media 21 caused by the backwash operation, elevates the mudballs to the undulant surface of the media. The ridge and trough configuration of the media surface thereupon urges the mudballs into the inlet port 36. At the confluence of the flow through the inlet port pipes 37 and the high velocity injectors 32, the mudballs are broken into smaller particles and carried downwardly to be reinjected into the filter media through the lateral ejectors or outlet ports 35.

Through the recirculation process, mudballs are repeatedly exposed to the disruptive effect of the jet of high pressure fluid traveling through the injectors 32 and eventually assume a minute particle size.

Furthermore, any of the filter media particles which enter the inlet port 36 follow an identical path and are thereby effectively scoured of any coagulant particles which may have become attached to the media.

Fluid and suspended flocculated solid matter in the filter cell 15 above the filter media 21 are continuously removed from the cell by pump 42 and recycled to the clarifier 27 through return pipes 30 or overflow pipes at the surface of the fluid and formed with openings 33.

The fluid and suspended flocculated solid matter are introduced at a lower portion of the clarifier 27 as shown in FIG. 2 and forced to flow upwardly to a higher level where the substantially pure, or clarified fluid, is withdrawn by the pump 28. The upflow velocity of the fluid through the clarifier 27 is designed to be insufficient to maintain the flocculated solid matter in suspension. Thus, although the fluid flows upwardly through the clarifier 27, as indicated by the solid line arrows in FIG. 2, the flocculated solid matter sinks downwardly under the force of gravity, as indicated by broken line arrows. This flocculated solid matter may be either removed continuously or periodically through a drain pipe 44.

The backwash process is continued until substantially all flocculated solid matter is removed from the cells 15 of the filter bed 12. A virtually unlimited supply of clarified fluid is available for backwash since the backwash fluid is continuously recycled and clarified, as previously described.

As the final step of the process, the pump 23 is reversed to provide a final "polishing" of the filter media 21 using pure or clear fluid from the tank 24. As previously indicated, the backwash cycle requires about 2% clear filtered fluid, or filtrate, including the "polish" step. This 2% returned to the system from the filtrate tank 24 overflows into the pipe 46 which leads to the raw water supply.

It can therefore be seen that by establishing during backwash a predetermined flow regime in the individual cells of the filter bed, the filter media can be made to well upwardly, or expand, in such a manner as to carry accumulated solid matter upwardly into the fluid region above the filter bed for withdrawal to a clarifier and concurrently to form a series of radial ridges and interspersed trough-like valleys in the filter media top surface. The trough and ridge configuration cooperates in guiding mudballs and media particles with attached coagulant particles into adjacent ports where high pressure jet flow comminutes the mudballs and scours away the coagulant particles attached to the filter media. At the same time, the clarifier is so operated as to provide the great majority of the backwash fluid with but a minimum quantity of clear filtered fluid being used to remove any residual flocculated solid matter.

The modular or cellular construction of the filter bed affords careful control over the filter media level and surface configuration of the media so that during the backwash cycle, scouring of the media particles and comminution of undesirable dense accumulations of solid material is readily effected. Efficient filtration is also obtained owing to the use of filter media granules which are relatively large in size, such use being made feasible as a result of the speed and effectiveness of the backwash cycle.

What is claimed is:

1. A method of filtering suspended solid matter from a fluid containing a coagulant comprising the steps of:

a. providing a filter bed containing particulate filter media having an average particle size large enough to cause flocculation of the solid matter in the filter media;

b. passing the fluid downwardly through the filter media to cause flocculation and entrapment of the solid matter;

c. removing filtrate from the base of the filter media until substantially such time as breakthrough of the solid matter occurs;

d. stopping steps b. and c.;

e. injecting clarified fluid into the base of the filter media causing the clarified fluid to upflow through the filter media at an upflow velocity sufficient to fluidize and expand the filter media and to carry the accumulated solid matter upwardly into the fluid above the filter media;

f. withdrawing a mixture of fluidized filter media, fluid and accumulated solid matter from the vicinity of the top surface of the fluidized filter media and passing the mixture through a zone of high fluid energy dissipation at a rate sufficient hydraulically to scour accumulated solid matter from the filter media particles;

g. conducting the mixture passing through the zone of high fluid energy dissipation to the base of the filter media effecting a circulatory upward flow of scoured filter media for a period of time sufficient hydraulically to scour accumulated solid matter from substantially all the filter media particles in the filter bed;

h. removing fluid and solid matter from the filter bed above the filter media;

i. clarifying the removed fluid and solid matter;

j. recycling the clarified fluid as in step e; and, k. stopping steps e. through j, and resuming steps b. and c.

2. A method as in claim 1 further comprising the step, performed subsequent to step j, of:

l. causing filtrate to upflow through the filter media to remove residual solid matter.

3. A method as in claim 1 further comprising the step, performed prior to step e. of:

m. injecting filtrate into the base of the filter media partially fluidizing and expanding the filter media.

4. An apparatus for filtering suspended solid matter from a fluid comprising:

a. a filter bed containing particulate filter media having an average particle size large enough to cause flocculation of the solid matter in the filter bed when said fluid has been treated with coagulant;

b. means for passing the fluid downwardly through the filter bed to cause flocculation and entrapment of the suspended solid matter;

c. first fluid transfer means for removing fluid from the portion of the filter bed above the filter media;

d. means for clarifying the removed fluid;

e. second fluid transfer means for injecting the clarified fluid from said clarifying means into said filter bed at the bottom of the filter media causing the clarified fluid to upflow through the filter media for backwashing, the upflow velocity of the clarified fluid being sufficient partially to expand the filter media and to carry the flocculated solid matter therethrough into the fluid above the filter media, said second fluid transfer means being constructed to inject the clarified fluid into said filter bed with sufficient velocity to cause the flocculated solid matter to be suspended in the fluid above the filter media, said second fluid transfer means including a pipe extending vertically through said filter media and including at least one inlet port connected to said pipe in the vicinity of the top surface of the filter media capable of receiving relatively dense accumulations of solid matter and solid particulate and flocculated material on the filter media particles carried to the top surface, the fluid flowing through said pipe being effective to comminute the solid matter received by said inlet port; and at least one outlet port for returning the comminuted solids to said filter bed and, f. third fluid transfer means for removing filtrate from said filter bed.

5. An apparatus as in claim 4 further comprising means for coagulating the solid matter prior to introduction into said filter bed.

6. An apparatus as in claim 4 in which said clarifying means comprises means for causing the fluid removed from said filter bed to upflow at a velocity insufficient to cause the solid matter to remain in suspension and means for removing the accumulated solid matter unable to remain in suspension.

7. An apparatus as in claim 4 further comprising means for causing filtrate to upflow through the filter media to remove residual solid matter in the filter media.

8. An apparatus as in claim 4 wherein said inlet port is located adjacent the bottom of a trough-like depression formed in the top surface of the filter media as the filter media is expanded by the injection of clarified fluid through said pipe into the lower portion of the filter media at a predetermined velocity.

9. An apparatus as in claim 8 in which said pipe is located centrally of the filter media, in which there is a plurality of angularly spaced inlet ports, and in which each of said inlet ports is located at the top surface of the expanded filter media during upflow of the clarified fluid to form a corresponding plurality of radial troughs leading to respective ones of said inlet ports and radial ridges interspersed between said troughs.

* * * * *